US006479145B1

(12) United States Patent
Srienc et al.

(10) Patent No.: US 6,479,145 B1
(45) Date of Patent: Nov. 12, 2002

(54) BIOPOLYMERS AND BIOPOLYMER BLENDS, AND METHOD FOR PRODUCING SAME

(75) Inventors: Friedrich Srienc, Lake Elmo; Aaron S. Kelley, St. Paul; Nikolaos Mantzaris, Minneapolis, all of MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 09/392,465

(22) Filed: Sep. 9, 1999

(51) Int. Cl.$^7$ ............................. B32B 5/16; A61K 9/16
(52) U.S. Cl. ...................... 428/403; 424/490; 428/407
(58) Field of Search .......................... 428/403, 407; 424/489, 490

(56) References Cited

U.S. PATENT DOCUMENTS

| | | | |
|---|---|---|---|
| 5,614,576 A | | 3/1997 | Rutherford et al. |
| 5,753,364 A | | 5/1998 | Rutherford et al. |
| 5,891,686 A | | 4/1999 | Dennis et al. |
| 5,990,271 A | * | 11/1999 | Noda ........................ 528/361 |
| 6,022,729 A | * | 2/2000 | Steinbuchel et al. ...... 435/252.3 |
| 6,027,787 A | * | 2/2000 | Noda ........................ 428/138 |
| 6,077,931 A | * | 6/2000 | Noda ........................ 528/354 |
| 6,091,002 A | | 7/2000 | Asrar et al. |
| 6,193,951 B1 | * | 2/2001 | Ottoboni et al. ............. 424/9.5 |
| 6,383,500 B1 | * | 5/2002 | Wooley et al. .............. 424/401 |

FOREIGN PATENT DOCUMENTS

WO   WO 00/06762   10/2000

OTHER PUBLICATIONS

Anderson and Dawes, "Occurrence, Metabolism, Metabolic Role, and Industrial Uses of Bacterial Polyhydroxyalkanoates", *Microbiol. Rev.*, 54:450–472 (1990).

Babu et al., "Poly–3–hydroxyalkanoates As Pressure Sensitive Adhesives" *1996 Int'l Symp. on Bact. Polyhydroxyalkanoates*, 46–55 (1996).

Kelley et al., "Engineering the Composition of Co–Polyesters Synthesized by *Alcaligenes eutrophus*", *Polymer Degradation and Stability*, 59:187–190 (1998).

Kelley and Srienc, "Production of Two Phase Polyhydroxyalkanoic Acid Granules In *Ralstonia eutropha*", *Int'l J. Biological Macromolecules*, 25:61–67 (1999).

Kim et al., "Poly(3–hydroxyalkanoate)s Produced by *Pseudomonas oleovorans* Grown by Feeding Nonanoic and 10–Undecenoic Acids in Sequence", *Polym. J.*, 29:894–898 (1997).

Barham et al., "Mechanical Properties of Polyhydroxybutyrate–hydroxybutyrate–hydroxyvalerate Copolymer Blends", *J. Mater. Sci.*, 19:1676 (1994).

Curley et al., "Sequential Production of Two Different Polyesters in the Inclusion Bodies of *Pseudomonas oleovorans*", 19:29–34 (1996).

* cited by examiner

Primary Examiner—Hoa T. Le
(74) Attorney, Agent, or Firm—Fish & Richardson P.C., P.A.

(57) ABSTRACT

Biopolymers and biopolymer blends, including block copolymers, prepared via enzyme-mediated catalysis preferably in a microorganism host in which the reaction conditions are selected to produce biopolymers and biopolymer blends having particular chemical compositions and microstructures.

34 Claims, 2 Drawing Sheets

BIOPOLYMERS AND BIOPOLYMER BLENDS, AND METHOD FOR PRODUCING SAME

STATEMENT AS TO FEDERALLY SPONORERD RESEARCH

This invention was funded pursuant to a grant received from the Consortium for Plant Biotechnology Research (Grant No. OR22072-77). Accordingly, the government may have rights in this invention.

BACKGROUND OF THE INVENTION

This invention relates to preparing biopolymers and biopolymer blends by enzyme-mediated catalysis e.g., in a microorganism host. Biopolymers are polymers that can be prepared via enzyme-mediated catalysis either in vitrn or in a microorganism host such as a bacterium. These biopolymers are desirable because they are biodegradable and biocompatible, making them suitable for a number of applications. In a typical procedure, one or more nutrients is fed to bacterial cells containing polymerase enzymes capable of processing the nutrients to form the desired biopolymer. The biopolymer is deposited in the form of osmotically inert, intracellular granules that are then extracted from the cells. This procedure has been used, for example, to prepare homopolymers and random copolymers containing 3-hydroxy organoate units.

SUMMARY OF THE INVENTION

The inventors have discovered how to control the microstructure and chemical composition of biopolymers and biopolymer blends produced via enzyme-mediated catalysis. Accordingly, it is now possible to prepare biopolymers and biopolymer blends that are tailored to meet the needs of a specific application. In particular, block copolymers and phase-separated blends can be prepared.

The phase-separated blends feature particles having a biopolymer-containing core substantially surrounded by a biopolymer-containing shell in which the core and shell have different chemical compositions. The biopolymers may be in the form of homopolymers, copolymers, or combinations thereof, where "homopolymer" refers to a polymer having a single type of monomer unit and "copolymer" refers to a polymer having two or more different monomer units. The thickness of the shell is less than about 1 micrometer, preferably less than about 0.1 micrometer, and more preferably less than about 0.05 micrometer.

A number of different core/shell combinations can be prepared. According to one embodiment, the core includes a homopolymer and the shell includes a copolymer, preferably in which the copolymer and homopolymer have common monomer units. Alternatively, the core can include the copolymer and the shell can include the homopolymer. The particle can further include one or more additional shell layers.

Particularly useful biopolymers are homopolymers and copolymers that include hydroxy organoate units. Such units have the general formula:

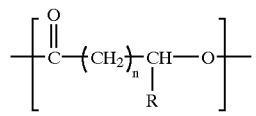

where R is a group containing between 1 and 30 carbon atoms, inclusive, and n is at least 1. Examples include 3-hydroxy organoate units (n=1) and 4-hydroxy organoate units (n=2). Specific examples include 3-hydroxy butyrate (R=methyl; n=1), 3-hydroxy valerate (R=ethyl; n=1), and combinations thereof. In one embodiment, the core includes a homopolymer containing 3-hydroxy butyrate units and the shell includes a copolymer containing 3-hydroxy butyrate and 3-hydroxy valerate units. In another embodiment, the core includes a copolymer containing 3-hydroxy butyrate and 3-hydroxy valerate units, and the shell includes a homopolymer containing 3-hydroxy butyrate units.

Block copolymers having at least two blocks can also be prepared. Preferably, the blocks contain 3-hydroxy organoate units. For example, the first block may contain 3-hydroxy butyrate units and the second block may contain 3-hydroxy valerate units.

The biopolymers and biopolymer blends may be prepared using microorganism hosts by controlling the nutrients available to the microorganism, resulting in the sequential formation of different polymers, or polymer blocks, within the same granule. In the case of block copolymers, for example, the relative amounts of the nutrients and the timing of introduction into the microorganism may be selected such that the first nutrient is available for reaction substantially throughout the process and the second nutrient is available for reaction throughout selected portions of the process.

The biopolymers and biopolymer blends are useful in a number of applications. For example, they may be compounded with a tackifier and, optionally, a crosslinking agent to form an adhesive composition. Examples of suitable tackifiers and crosslinking agents are described, e.g., in Rutherford et al., U.S. Pat. No. 5,614,576 and Rutherford et al., U.S. Pat. No. 5,753,364, both of which are hereby incorporated by reference. It is also possible to combine the biopolymers and biopolymer blends with another polymer matrix to modify the properties of the polymer matrix. For example, the two phase biopolymer particles can be incorporated into a brittle polymer such as polystyrene to improve the impact resistance of the brittle polymer.

Other features and advantages will be apparent from the following description of preferred embodiments thereof, and from the claims.

DETAILED DESCRIPTION

Figure 1:
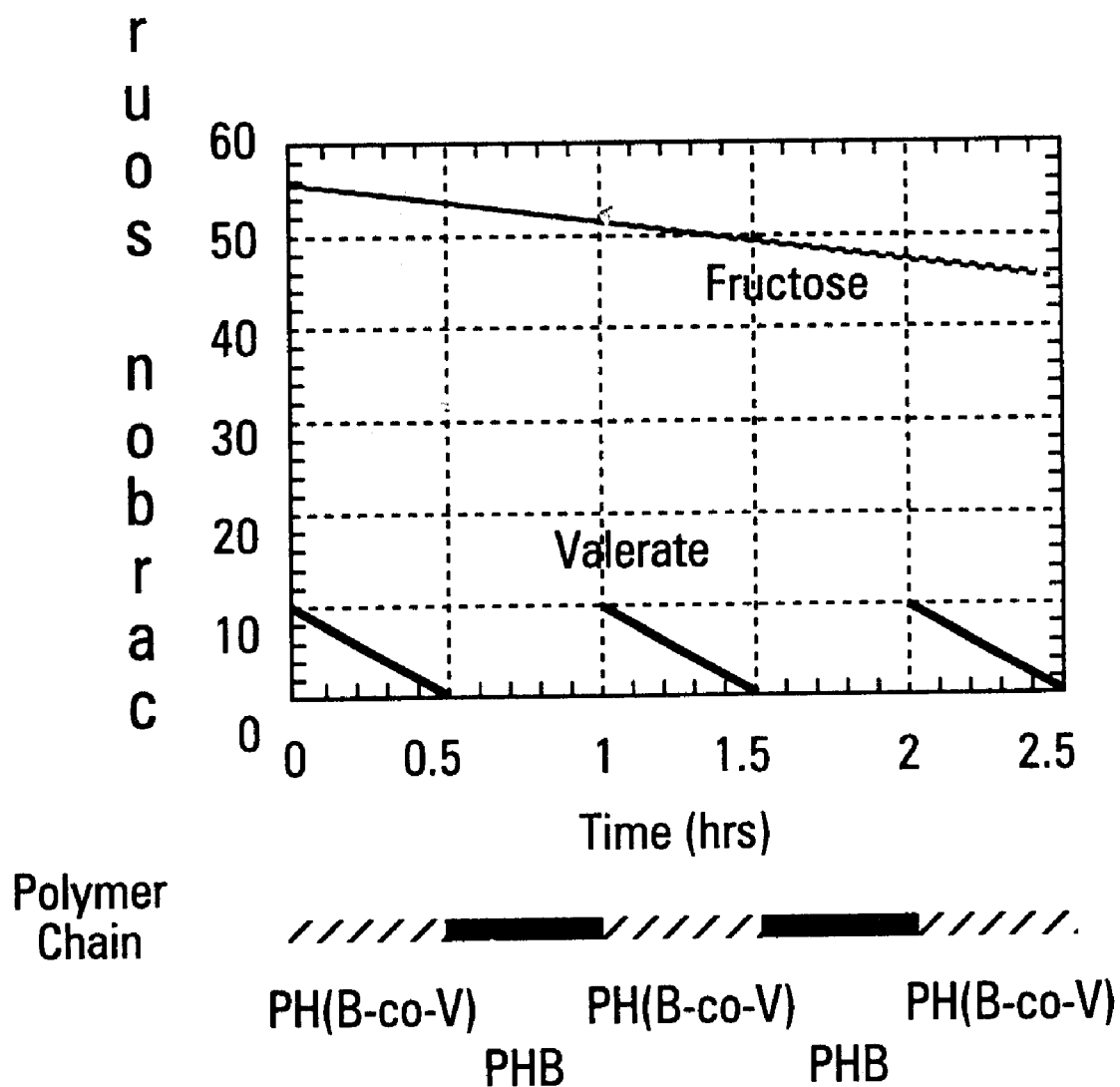
FIG. 1 is a graph of carbon source concentration vs. time for the production of block copolymers from fructose and 3-hydroxy valeric acid starting materials.

Biopolymers and biopolymer blends according to the invention are preferably produced from microorganisms via enzyme-mediated catalysis under nutrient-limited conditions. The microorganism serves as a bioreactor. The microorganism is selected based upon the desired biopolymer. Specifically, microorganisms having polymerases suitable for catalyzing the reaction of monomers to produce the desired biopolymer are selected. The polymerases may be native to the particular microorganism. Alternatively, the microorganism can be genetically engineered using known techniques to contain the desired polymerases.

One class of useful microorganisms includes bacteria. Specific examples include *Pseudomonas aeruginosa, Ralstonia eutropha* (formerly *Alcaligenes eutrophus*), *Rhodospirillum rubrum*, and *Bacillus megaterium*. Each of these bacteria is capable of metabolizing nutrient sources including alkanes, alkanols, organoic acids, alkenes, alkenols, alkenoic acids, and esters, for example, to produce biopolymers such as poly(hydroxy organoates). *R. eutropha* is particularly useful for reacting 3-hydroxy butyric acid and 3-hydroxy organoic acid monomers having an odd number of carbon atoms such as 3-hydroxy valeric acid, as well as precursors thereof, to form poly(3-hydroxy organoate) polymers and copolymers.

To prepare the biopolymer or biopolymer blend, appropriate starting materials are introduced into the microorganism. In the case of poly(hydroxy organoate) biopolymers, the starting materials may include hydroxy organoic acids or precursors thereof. An example of a suitable precursor is fructose which the microorganism metabolizes to form 3-hydroxy butyric acid monomer.

The chemical composition and microstructure of the biopolymer product are influenced by the relative amounts of starting materials, the concentration of microorganisms, and the timing of nutrient introduction into the bioreactor (i.e., the point at which the starting material is added to the microorganism). For example, in the case of a reaction involving fructose (as a source of 3-hydroxy butyric acid) and an odd chain fatty acid such as 3-hydroxy valeric acid, if fructose is fed with a limited amount of the valeric acid monomer, poly(3-hydroxy valerate) will no longer be produced after exhaustion of the valerate, resulting in a polymer particle featuring a poly(3-hydroxy (butyrate-co-valerate)) copolymer core substantially surrounded by a poly(3-hydroxy butyrate) homopolymer shell. On the other hand, supplying the valeric acid monomer halfway through particle synthesis on fructose results in a polymer particle featuring a poly(3-hydroxy butyrate) homopolymer core substantially surrounded by a poly(3-hydroxy (butyrate-co-valerate)) copolymer shell. By increasing cell density and/or decreasing the amount of valeric acid fed to the bacteria, it is possible to stop copolymer synthesis within a polymer chain, resulting in the formation of block copolymers having a poly(3-hydroxy butyrate) block and a poly(3-hydroxy (butyrate-co-valerate)) copolymer block.

A theoretical model has been developed to enable the experimental conditions to be designed for production of a given biopolymer. The model (1) describes the experimentally observed molecular weight distribution in a culture of biopolymer-producing cells, and (2) predicts transient synthesis situations encountered during the proposed polymer synthesis process. The model can be used, for example, to predict and delineate the conditions that lead to the formation of block copolymers.

The model assumes that polymerase molecules sit on the surface of polymer granules and catalyze the addition of monomer units to the growing ("elongating") polymer chain that is aggregating into or onto the granule. After initiation, chains are elongating until an irreversible termination step detaches the chain from the polymerase enzyme. Given a constant supply of monomer units, the polymer synthesis is governed by three rates describing initiation, elongation, and termination of polymer chains. The model results in the following population balance that describes generally the dynamics of the molecular weight distribution of polymer chains that changes in time t:

$$\frac{\partial A(x,t)}{\partial t} + \frac{\partial}{\partial x}[R_{el}(x,S)A(x,t)] + R_t(x,S)A(x,t) = 0 \quad (1)$$

$$\frac{\partial I(x,t)}{\partial t} = R_t(x,S)I(x,t)$$

where $A(x,t)$ and $I(x,t)$ are the molecular weight distribution of active and inactive chains, respectively; $R_{el}$ is the elongation rate; $R_i$ is the initiation rate; and $R_t$ is the termination rate. In the general case, the initiation and elongation rates depend on the molecular weight "x" of a chain and on the monomer concentration "S". The initiation rate contributes to the physical picture through the boundary condition.

Assuming a steady state synthesis, equation (1) can be solved for the active chain distribution on the basis of the measurable and time invariant overall distribution $w(x)$, representing the sum of $A(x)$ and $I(x)$, using the relationship:

$$A(x) = \frac{1}{R_{el}} \cdot \frac{N_A R_p}{\int_{x\min}^{x\max} xw(x)dx} \cdot \int_x^{x\max} w(y)dy \quad (2)$$

where $N_A$ is Avogadro's number. After determining the active chain distribution $A(x)$, the termination rate $R_t$ is determined using the following equation:

$$R_t(x) = \frac{1}{A(x)} \cdot \frac{N_A R_p w(x)}{\int_{x\min}^{x\max} xw(x)dx} \quad (3)$$

Gel permeation chromatography can be used to measure the time invariant molecular weight distribution for different synthesis conditions. This value can then be used to estimate the unknown active chain distribution and termination rate. Specifically, the former can be directly computed from the measured molecular weight distribution using Equation (2), while the latter as a function of molecular weight of chains, can be obtained using Equation (3). Once the model parameters have been identified, the steady state molecular weight distribution can be computed by solving Equation (1).

This model has been used to design experiments that would produce block copolymers in *R. eutropha* using, as starting materials, fructose and 3-hydroxy valeric acid. The experimental conditions predicted to yield block copolymers in this reaction are shown in FIG. 1. The graph in FIG. 1 plots carbon source concentration vs. time. According to the graph, if valeric acid consumption is faster than the time required to synthesize a polymer chain, block copolymers result. The residence time of valeric acid in the media can be controlled by the cell concentration and the initial valeric acid concentration.

The invention will now be described further by way of the following example.

EXAMPLE

This example describes the preparation and characterization of polymer granules featuring a core containing the copolymer poly(3-hydroxy (butyrate-co-valerate)) and a shell containing poly(3-hydroxy butyrate) homopolymer. Throughout the example, "PHA" refers to poly(3-hydroxyorganoate), "PHB" refers to poly(3-hydroxy butyrate), "PHV" refers to poly(3-hydroxy valerate), and "PH(B-co-V)" refers to poly(3-hydroxy (butyrate-co-valerate)).

Materials

Epon-Araldite epoxy resin and 200-mesh copper grids for transmission electron microscopy (TEM) were purchased from Ted-Pella (Reading, Calif.). Homo-PHB samples were received from Monsanto. PH(B-co-V) (49% HV) was prepared in a bioreactor (conditions presented below) with *R. eutropha* grown on 10 g/l fructose and 1 g/l valeric acid for 24 h. All other media components and chemicals were purchased from Sigma (St. Louis, Mo.).

Baterial Growth

*R. eutropha* H16 (ATCC 17699) was used in all polymer production experiments. Inocula were grown in 4-1 shake flasks with 1.5 l of mineral salts medium with 30 g/l fructose and 4 g/l $(NH_4)_2SO_4$ to an $OD_{436}$ of 4.0 measured on a spectrophotometer (Model 8452A, Hewlett Packard, Avondale, Pa.). Cells were harvested in exponential growth ($\mu$=0.33/h) and washed twice with sterile phosphate buffer (0.036 M, pH 7.0). Cells were then inoculated into 1.5 l of (0.036 M, pH 7.0). Cells were then inoculated into 1.5 l of minimal media (~0.4 g/l) containing 0.02 g/l $(NH_4)_2SO_4$ and the indicated carbon source/s (10 g/l fructose, 1 g/l valerate). Nitrogen was included to facilitate adaptation of the culture to new media conditions containing fatty acids. The low nitrogen levels could only be used to produce approximately 6 mg/l of biomass and thus contributed insignificantly to growth at the cell density used. Reactors were operated at 700 rpm, 30° C., pH 7 (controlled with 1M NaOH and 4% $H_3PO_4$), and 1 vvm air flow; dissolved oxygen remained above 90%.

Gas Chromatography (GC) analysis of PHAs

All polymer samples were analyzed by propanolysis and subsequent GC analysis according to standard protocols described in Riis et al., J. Chromatogr. (1988) 445:285.

Substrate Analysis

Fructose levels in the media were measured using a D-Glucose/D-Fructose Enzymatic BioAnalysis kit (Boehringer Mannheim, Mannheim, Germany). Valeric acid concentrations were measured using gas chromatography (GC). GC vials were filled with 0.85 ml of sample supernatant. A total of 75 μl of a 1-N HCl solution with 0.2 g/l isovaleric acid was added to acidify the samples. The isovaleric acid served as an internal standard. Samples were run on a DB-FFAP column with the following temperature profile: 100° C. for 5 min, ramp at 10° C./min, final temperature of 200° C. for 5 min (J&W Scientific, Folsom, Calif.). Retention times were approximately 10.5 min for isovalerate and 11.5 min for valeric acid. A calibration curve was established for each set of samples.

Granule Isolation

Harvested cells were concentrated, by centrifugation, approximately 100-fold. The cell slurry was passed through a French Press twice at a cell pressure of 10,000 psi. After settling overnight, 150 μl of settled cell slurry containing the granules was added to 15 ml of a 1% Triton surfactant solution at pH 13 and agitated at room temperature for 15 min. Granules were centrifuged at 4000×g for 15 min and washed twice with distilled water. Granules were dried overnight at room temperature under vacuum to remove all of the water.

Differential Scanning Calorimetry (DSC)

DSC was used to determine if the granules were layered structures having two distinct phases. DSC analysis was carried out on a liquid nitrogen cooled DSC (Pyris model, Perkin-Elmer, Norwalk, Conn.). Samples were taken from the bioreactor at 6, 12, 18, and 24h. Granules were isolated from the bacteria as described above. For glass transition measurements, 9–10 mg samples were used. The temperature was ramped to 200° C., held for 1 min, followed by slow quenching at a rate of −20° C./min to a final temperature of −60° C. A rate of 20° C/min from −60° C. to 30° C. was used to analyze glass transition temperatures.

TEM Preparation

TEM measurements were also used to determine if the granules were layered structures having two distinct phases. As in the case of the DSC measurements, samples were taken from the bioreactor at 6, 12, 18, and 24h. Dried granules were fixed in Epon-Araldite epoxy for 2 days at 60° C. The samples were cryo-microtomed at −20° C. to form a smooth face of exposed polymer. Each epoxy block was stained with $RuO_4$ vapor. Specimens were taped to the lid of a 5-ml glass vial containing 0.02 g $RuCl_3$-$xH_2O$ and 1 ml NaOCl (10–13%), sealed and stained for 7.5 h. After staining, the samples were removed and stored in a hood to dry.

Staining sufficiently hardened the samples so that cryomicrotomy was no longer necessary. Samples were cut 70 nm thick as close to the stained surface as possible. Increased depth of cutting gave slices with decreased staining, allowing a desired contrast to be achieved by changing the cutting depth. Sections were placed on 200-mesh copper grids and viewed in an electron microscope at 60 kV (JEM1200ex2, Joel, Boston, Mass.).

Results

PH(B-co-V) was produced during the first 12 h. of the reaction. The PHV and PHB synthesis rates were 0.030 g PHV/l per h and 0.033 g PHB/l per h, giving a copolymer composition of 48% HV. The valerate was exhausted at approximately 12 h at a rate of 0.0894 g/l per h after which only PHB was produced at 0.033 g PHB/l per h from the remaining fructose, which was utilized at a constant rate of 0.0861 g/l per h throughout all 24 h of the experiment. The concentration of PHV in the reactor remained constant during the last 12 h of the experiment, suggesting that no degradation of polymer occurs concomitantly with new polymer synthesis.

DSC measurements of the isolated granules confirmed the presence of two polymer phases in the granules. Glass transition temperatures of the individual components PH(B-co-V) (49% HV) and PHB were determined to be −5° C. and 5° C., respectively. Each sample throughout the course of the reaction showed two distinct glass transitions, indicating the presence of two phases. Table I shows the weight percent of each type of polymer in the granule at various stages during the course of the reaction. All amounts are based upon percentage of total polymer weight. "% CDW" refers to the polymer percentage of cell dry weight.

TABLE I

| Time (h) | % CDW | % PHB | % PH(B-co-V) |
|---|---|---|---|
| 0 | 21 | 100 | 0 |
| 6 | 53 | 23 | 77 |
| 12 | 59 | 13 | 87 |
| 18 | 66 | 31 | 69 |
| 24 | 66 | 41 | 59 |

The results shown in Table I show that during the first 12 h, only PH(B-co-V) was being produced. Nevertheless, two glass transitions were observed because of the PHB stored during inoculum growth, prior to introduction into the reactor. After 12 h, only PHB is formed. The 5° C. transition was observed to increase with the increasing PHB weight fraction of the sample because glass transition heatflow changes are directly proportional to the mass of that component in the sample.

TEM imaging confirmed the presence of layered granules consisting of a copolymer core and a homopolymer shell. The results are shown in FIGS. 2A–2D. PHB regions are shown as light gray regions, while PH(B-co-V) regions are dark gray regions.

Figure 2A:
FIGS. 2A–2D are a series of microphotographs obtained from transmission electron microscopy throughout the course of the reaction involving fructose and 3-hydroxy valeric acid starting materials that ultimately yielded polymer particles having copolymer core surrounded by a homopolymer shell.
Figure 2B:
Figure 2C:
Figure 2D:

Referring to FIGS. 2A–2D, some regions of PHB were seen in the 6 and 12 h samples because of the PHB stored during inoculum growth. The granules of PH(B-co-V) seemed to coalesce, making it difficult to discern individual granule boundaries. The PH(B-co-V) granules likely coalesce much easier than the PHB granules because of their lower crystallinity. At 18 and 24 h, layered granule structures became clearly visible (FIGS. 2C and 2D).

Other embodiments are within the following claims.

What is claimed is:

1. A polymer particle comprising:
    (a) a core comprising a first biopolymer; and
    (b) a shell substantially surrounding said core comprising a second biopolymer different from said first biopolymer, said shell having a thickness that is less than about 1 micrometer.

2. A polymer particle according to claim 1 wherein said shell has a thickness that is less than about 0.1 micrometer.

3. A polymer particle according to claim 1 wherein said shell has a thickness that is less than about 0.05 micrometer.

4. A polymer particle according to claim 1 wherein said first biopolymer and said second biopolymer comprise hydroxy organoate units.

5. A polymer particle according to claim 4 wherein said hydroxy organoate units are selected from the group consisting of 3-hydroxy organoates, 4-hydroxy organoates, and combinations thereof.

6. A polymer particle according to claim 4 wherein said hydroxy organoate units are selected from the group consisting of 3-hydroxy butyrate, 3-hydroxy valerate, and combinations thereof.

7. A polymer particle according to claim 4 wherein said first biopolymer comprises 3-hydroxy butyrate units.

8. A polymer particle according to claim 4 wherein said second biopolymer comprises 3-hydroxy butyrate units.

9. A polymer particle according to claim 4 wherein said first biopolymer comprises 3-hydroxy valerate units.

10. A polymer particle according to claim 4 wherein said second biopolymer comprises 3-hydroxy valerate units.

11. A polymer particle according to claim 1 wherein said first biopolymer is a homopolymer and said second biopolymer is a copolymer.

12. A polymer according to claim 11 wherein said second biopolymer is a block copolymer.

13. A polymer particle according to claim 11 wherein said first biopolymer is a homopolymer comprising 3-hydroxy butyrate units and said second biopolymer is a copolymer comprising 3-hydroxy butyrate and 3-hydroxy valerate units.

14. A polymer particle according to claim 1 wherein said first biopolymer is a copolymer and said second biopolymer is a homopolymer.

15. A polymer particle according to claim 14 wherein said first biopolymer is a block copolymer.

16. A polymer particle according to claim 14 wherein said first biopolymer is a copolymer comprising 3-hydroxy butyrate and 3-hydroxy valerate units, and said second biopolymer is a homopolymer comprising 3-hydroxy butyrate units.

17. A polymer particle comprising:
    (a) a core comprising a first biopolymer comprising units selected from the group consisting of 3-hydroxy butyrate, 3-hydroxy valerate, and combinations thereof; and
    (b) a shell substantially surrounding said core comprising a second biopolymer comprising units selected from the group consisting of 3-hydroxy butyrate, 3-hydroxy valerate, and combinations thereof,
    wherein said second biopolymer is different from said first biopolymer.

18. A polymer particle according to claim 17 wherein said first biopolymer is a homopolymer and said second biopolymer is a copolymer.

19. A polymer particle according to claim 18 wherein said first biopolymer is a homopolymer comprising 3-hydroxy butyrate units and said second biopolymer is a copolymer comprising 3-hydroxy butyrate and 3-hydroxy valerate units.

20. A polymer particle according to claim 17 wherein said first biopolymer is a copolymer and said second biopolymer is a homopolymer.

21. A polymer particle according to claim 20 wherein said first biopolymer is a copolymer comprising 3-hydroxy butyrate and 3-hydroxy valerate units, and said second biopolymer is a homopolymer comprising 3-hydroxy butyrate units.

22. A process for preparing a polymer particle comprising introducing first and second nutrients into a microorganism comprising a polymerase capable of processing said nutrients to form biopolymers,
    wherein the relative amounts of said nutrients and the timing of introduction into said microorganism are selected to produce a polymer particle comprising:
    (a) a core comprising a first biopolymer; and
    (b) a shell substantially surrounding said core comprising a second biopolymer different from said first biopolymer,
    said shell having a thickness that is less than about 1 micrometer.

23. A process according to claim 22 wherein said microorganism comprises a bacterium.

24. A process according to claim 22 wherein said bacterium comprises *R. eutropha*.

25. A process according to claim 22 wherein said first nutrient comprises a hydroxy organoic acid, or a precursor thereof, and said second nutrient comprises a hydroxy organoic acid, or a precursor thereof, that is different from said first nutrient.

26. A process according to claim 25 wherein said first nutrient comprises 25 3-hydroxy butyric acid, or a precursor thereof, and said second nutrient comprises 3-hydroxy valeric acid, or a precursor thereof.

27. A process according to claim 26 wherein said first nutrient comprises fructose.

28. A process according to claim 22 wherein the relative amounts of said nutrients and the timing of introduction into said microorganism are selected to produce a polymer particle comprising:
    (a) a core comprising a first biopolymer in the form of a homopolymer; and
    (b) a shell substantially surrounding said core comprising a second biopolymer in the form of a copolymer.

29. A process according to claim 28 wherein said first nutrient comprises a hydroxy organoic acid, or a precursor thereof, and said second nutrient comprises a hydroxy organoic acid, or a precursor thereof, that is different from said first nutrient.

30. A process according to claim 29 wherein said first nutrient comprises 3-hydroxy butyric acid, or a precursor thereof, and said second nutrient comprises 3-hydroxy valeric acid, or a precursor thereof, said polymer particle comprising:
(a) a core comprising a homopolymer comprising 3-hydroxy butyrate units; and
(b) a shell substantially surrounding said core comprising a copolymer comprising 3-hydroxy butyrate and 3-hydroxy valerate units.

31. A process according to claim 22 wherein the relative amounts of said nutrients and the timing of introduction into said microorganism are selected to produce a polymer particle comprising:
(a) a core comprising a first biopolymer in the form of a copolymer; and
(b) a shell substantially surrounding said core comprising a second biopolymer in the form of a homopolymer.

32. A process according to claim 31 wherein said first nutrient comprises a hydroxy organoic acid, or a precursor thereof, and said second nutrient comprises a hydroxy organoic acid, or a precursor thereof, that is different from said first nutrient.

33. An adhesive composition comprising:
(A) a plurality of polymer particles, each of which comprises:
(a) a core comprising a first biopolymer; and
(b) a shell substantially surrounding said core comprising a second biopolymer different from said first biopolymer,
said shell having a thickness that is less than about 1 micrometer; and
(B) a tackifier.

34. An adhesive composition according to claim 33 wherein said composition is crosslinked.

* * * * *